United States Patent
Weitershaus et al.

(10) Patent No.: US 9,145,617 B2
(45) Date of Patent: Sep. 29, 2015

(54) ADHESION PROMOTION OF CYANIDE-FREE WHITE BRONZE

(75) Inventors: Katharina Weitershaus, Kriens (CH); Wan Zhang-Beglinger, Adligenswil (CH); Jonas Guebey, Lucerne (CH)

(73) Assignee: Rohm and Haas Electronic Materials LLC

( * ) Notice: Subject to any disclaimer, the term of this patent is extended or adjusted under 35 U.S.C. 154(b) by 454 days.

(21) Appl. No.: 13/599,620

(22) Filed: Aug. 30, 2012

(65) Prior Publication Data

US 2013/0236742 A1    Sep. 12, 2013

Related U.S. Application Data

(60) Provisional application No. 61/529,088, filed on Aug. 30, 2011.

(51) Int. Cl.
*C23C 28/02* (2006.01)
*C25D 3/58* (2006.01)
*C25D 5/10* (2006.01)
*C25D 3/60* (2006.01)
*C25D 5/12* (2006.01)
*B32B 15/01* (2006.01)

(52) U.S. Cl.
CPC . *C25D 5/10* (2013.01); *B32B 15/01* (2013.01); *C25D 3/58* (2013.01); *C25D 3/60* (2013.01); *C25D 5/12* (2013.01); *Y10T 428/12903* (2015.01)

(58) Field of Classification Search
CPC ......... C23C 28/00; C23C 28/025; C25D 3/60
USPC .................................. 205/184, 241, 239, 240
See application file for complete search history.

(56) References Cited

U.S. PATENT DOCUMENTS

| | | | |
|---|---|---|---|
| 5,435,898 A | 7/1995 | Commander et al. | |
| 5,656,148 A | 8/1997 | Martyak et al. | |
| 5,718,818 A | 2/1998 | Martyak et al. | |
| 5,911,513 A * | 6/1999 | Tsuji et al. | 384/276 |
| 6,515,368 B1 | 2/2003 | Lopatin et al. | |
| 6,593,643 B1 | 7/2003 | Seki et al. | |
| 6,602,394 B1 | 8/2003 | Hillebrand | |
| 6,607,653 B1 | 8/2003 | Tsuji | |
| 6,706,167 B1 | 3/2004 | Pearson et al. | |
| 7,267,861 B2 | 9/2007 | Edwards et al. | |
| 7,780,839 B2 | 8/2010 | Egli et al. | |
| 8,142,906 B2 | 3/2012 | Taira et al. | |

(Continued)

FOREIGN PATENT DOCUMENTS

| | | | | |
|---|---|---|---|---|
| EP | 1111097 A2 * | 6/2001 | | C25D 3/60 |
| JP | 2002060992 A * | 2/2002 | | C25D 7/00 |

(Continued)

OTHER PUBLICATIONS

Kim et al, "Effects of residual impurities in electroplated Cu on the Kirkendall void formation during soldering", Applied Physics Letters, 2008, pp. 092109-1 thru 092109-3, vol. 92.

(Continued)

*Primary Examiner* — Edna Wong

(57) ABSTRACT

White bronze is electroplated from a cyanide-free tin/copper bath onto a void inhibiting layer coating a copper underlayer. The void inhibiting metal layer includes one or more void inhibiting metals.

6 Claims, 7 Drawing Sheets

(56) References Cited

U.S. PATENT DOCUMENTS

| | | |
|---|---|---|
| 2005/0067699 A1 | 3/2005 | Leong et al. |
| 2005/0184369 A1 | 8/2005 | Sonoda et al. |
| 2006/0137991 A1 | 6/2006 | Zschintzsch et al. |
| 2006/0276022 A1 | 12/2006 | Li et al. |
| 2008/0217916 A1 | 9/2008 | Natasaku et al. |
| 2011/0001250 A1 | 1/2011 | Lin et al. |

FOREIGN PATENT DOCUMENTS

| | | |
|---|---|---|
| JP | 3513709 | 3/2004 |
| JP | 2004091824 A | 3/2004 |
| WO | 9906612 A1 | 2/1999 |

OTHER PUBLICATIONS

Kim et al, "Effects of sulfide-forming element additions on the Kirkendall void formation and drop impact reliability of Cu/Sn-3.5Ag solder joints," Acta Materials, 2009, pp. 5001-5012, vol. 57.

European Search Report of corresponding European Application No. 14 15 6872.

Chinese Search Report of corresponding Chinese Application No. 201210312655.3.

\* cited by examiner

ADHESION PROMOTION OF CYANIDE-FREE WHITE BRONZE

This application claims the benefit of priority under 35 U.S.C. §119(e) to U.S. Provisional Application No. 61/529,088, filed Aug. 30, 2011, the entire contents of which application are incorporated herein by reference.

The present invention is directed to adhesion promotion of cyanide-free white bronze on a copper or copper alloy underlayer. More specifically, the present invention is directed to adhesion promotion of cyanide-free white bronze on a copper or copper alloy underlayer where the white bronze is electroplated from a cyanide-free white bronze electroplating bath onto a metal layer containing void inhibiting metals coating the copper or copper alloy underlayer.

Methods for electroplating white bronze or tin/copper alloys from cyanide containing baths are common. Such conventional cyanide-based white bronze electroplating processes are typically used for decorative applications where nickel is not desired because of its allergenic character or as a substitute for expensive silver or palladium. In such applications a high leveling acid copper or copper alloy underlayer is often used to achieve a mirror bright, low surface roughness decorative finish. However, in addition to industries which are dealing with decorative applications, a nickel replacement is also gaining importance in some technical fields, such as for coating electronic components or in mechanical engineering and in process technology for coating bearing overlays and friction layers and in some connector applications where the magnetic properties of nickel are undesirable.

Such conventional cyanide-based white bronze baths; however, are toxic, which makes their use problematic from an environmental standpoint as well as hazardous to workers using the baths. There has been for some years a push to develop cyanide-free baths; however, changes in the electrolyte of the bath have resulted in both technical and economic disadvantages. For example, electrolytes based on pyrophosphates or oxalates, which operate at a pH range of 5-9 have slow deposition rates. Additional problems which may arise from modifying the electrolyte include physical properties of the deposit such as grain size, morphology or alloy composition resulting in an undesirable deposit. Therefore the development of a cyanide-free white bronze process which may compete and finally replace well established nickel processes from an economic as well as from a technical point of view has been challenging and substantially unsuccessful.

Attempts have been made to use tin/copper white bronze from acidic cyanide-free baths to meet the technical requirements for a nickel alternative; however, intermetallic compound layers electroplated from acidic cyanide-free tin/copper plating baths have had poor adhesion on copper underlayers, such as on high leveling electroplated acid copper underlayers. The adhesion failure is due to the formation of voids. Such voids often referred to as Kirkendall voids. The phenomenon of Kirkendall void formation is well known. Although such voids are not observed using alkaline cyanide containing baths, due to the hazardous nature of the cyanide baths they are undesirable in the industry. Kirkendall voids are formed due to interdiffusion of copper and tin ions at the interface between copper and the electroplated intermetallic tin/copper compound layer deposited from acidic cyanide-free tin/copper baths. In addition, the higher temperature to which the tin/copper alloy and copper layer are exposed the greater the diffusion rate and therefore voiding and poor adhesion are also increased. Apparent voiding is typically observed after exposure to temperatures of 80° C. and higher.

Accordingly, there is a need for a method of improving adhesion of electroplated white bronze from a cyanide-free electroplating bath on copper or copper alloys.

Methods include providing a copper containing layer, depositing a metal layer comprising one or more void inhibiting metals adjacent the copper containing layer; and electroplating a tin/copper alloy layer from a cyanide-free tin/copper electroplating bath adjacent the metal layer comprising one or more void inhibiting metals. The methods provide good adhesion of tin/copper alloys to the copper containing layer and at the same time reduce voids often found at the interface between the tin/copper layer and the copper containing layer, even after exposure to elevated temperatures.

The methods may be used in the electronics industry for coating electronic components and in process technology for coating bearing overlays and friction layers. The methods may also be used to make jewelry and as a nickel replacement in decorative applications.

Figure 1:
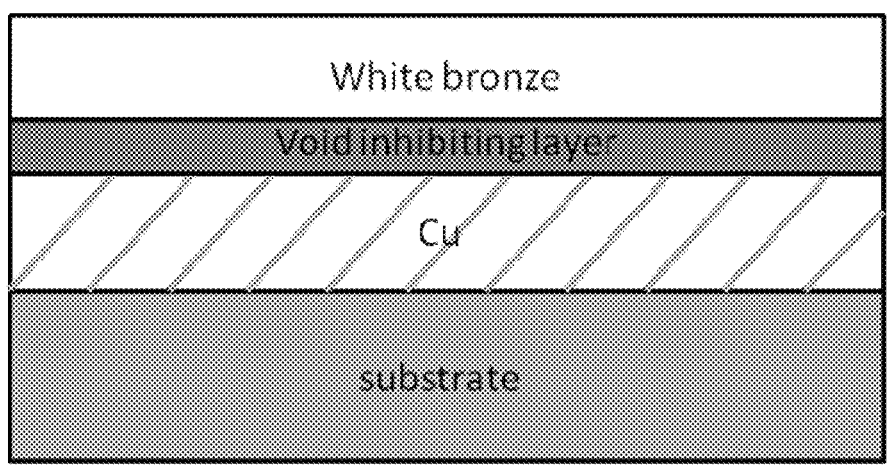
FIG. 1 is an illustration of a cross-section of an article with a white bronze layer on a void inhibiting metal layer on a copper or copper alloy layer on a substrate.

As used throughout the specification, the following abbreviations have the following meaning, unless the context clearly indicates otherwise: ° C.=degrees Centigrade; mg=milligrams; g=grams; L=liter; mL=milliliter; mm=millimeter; cm=centimeters; A=amperes; dm=decimeter; ASD=amperes per decimeter squared; V=volts; FE-SEM=field emission scanning electron microscope; PVD=physical vapor deposition; CVD=chemical vapor deposition; EO/PO=ethylene oxide/propylene oxide; µm=micron=micrometer and ppm=parts per million; terms "electroplating", "plating" and "depositing" are used interchangeably throughout the specification; terms the terms "film" and "layer" are used interchangeably throughout the specification; "adjacent" means "adjoining or next to and joined with". All numerical ranges are inclusive and combinable in any order, except where it is logical that such numerical ranges are construed to add up to 100%.

The copper containing layer may be copper or may be a copper alloy such as, but not limited to, tin/copper, silver/copper, gold/copper, copper/zinc, copper/nickel, copper/beryllium, tin/silver/copper and tin/copper/bismuth. Such tin alloys have a tin content of less than 10%. Such copper/zinc alloys have a zinc content of less than 4%. Such bismuth alloys have a bismuth content less than 10%. Preferably the copper containing layer is copper, silver/copper, gold/copper or nickel/copper, more preferably the copper containing layer is copper, silver/copper or nickel/copper. Most preferably the copper containing layer is copper.

The copper containing layer may be obtained commercially or the copper containing layer may be deposited adjacent a substrate by conventional methods known in the art and literature. Such methods include, but are not limited to electroplating, electroless plating, immersion plating, PVD and CVD. Preferably, the copper containing layer adjacent the substrate surface is deposited by electroplating, electroless plating and immersion plating. More preferably, the copper containing layer is deposited by electroplating or electroless plating, most preferably by electroplating. Conventional copper baths and copper alloy baths may be used to deposit copper or copper alloy on a substrate. Preferably, the copper or copper alloy is electrodeposited from a high leveling copper or copper alloy bath. Typically copper or copper alloy is plated at temperatures from room temperature to 80° C. or such as from room temperature to 50° C. When copper or copper alloy is electroplated, the current density may range from 0.1 ASD to 10 ASD, preferably, from 1-5 ASD. The deposited copper containing layer has a thickness of at least 5 μm or such as from 10 μm to 1000 μm or such as from 20 μm to 500 μm.

The form of the metal source may vary depending on the method used to deposit the metal. Typically when the metals are deposited by PVD and CVD, they are initially provided in their reduced metallic form. When the metals are deposited from electroplating, electroless and immersion baths, they are typically in the form of a water soluble salt. Sources of copper ions include, but are not limited to, cuprous salts or cupric salts. Cuprous salts ($Cu^+$) include, but are not limited to, cuprous oxide, cuprous chloride, cuprous bromide and cuprous iodide. Cupric salts ($Cu^{2+}$) include, but are not limited to, cupric organosulfates, such as cupric methanesulfonate, cupric sulfate, cupric chloride, cupric bromide, cupric iodide, cupric oxide, cupric phosphate, cupric pyrophosphate, cupric acetate, cupric citrate, cupric gluconate, cupric tartrate, cupric lactate, cupric succinate, cupric sulfamate, cupric borofluoride, cupric formate and cupric silicofluoride. Preferably the cuprous and cupric salts are water soluble. Copper salts may be included in conventional amounts. Typically they are included in amounts of 0.1 g/L to 200 g/L or such as from 0.5 g/L to 150 g/L or such as from 1 g/l to 50 g/L.

The copper plating baths may include one or more conventional additives, such as but not limited to, electrolytes, brighteners, levelers, hardeners, wetting agents, surfactants, ductility modifiers, suppressors, antioxidants, buffers, pH adjusting agents, reducing agents, chelating and complexing agents. Copper alloy plating baths also include one or more alloying metals in conventional amounts. Such additives are well known in the art and literature and may be included in the copper baths in conventional amounts. Preferably, the copper or copper alloy electroplating baths include one or more levelers at concentrations to provide a high leveling copper electroplating bath. High leveling is desired to provide a substantially smooth surface to receive the metal layer containing one or more void inhibiting metals as well as a white bronze top layer. Typically levelers such as, but not limited to, dyes, and brightener compounds such as, but not limited to, disulfides, are included in the copper baths in amounts of 500 ppm to 1 g/L, preferably from 750 ppm to 1 g/L. Such levelers are well known in art and literature.

While the pH range of the copper or copper alloy baths may range from less than 1 to 14, preferably, the copper or copper alloy baths are below 7. More preferably, the pH of the copper baths are from less than 1 to 6, or such as from less than 1 to 4, or such as from less than 1 to 3. Acid copper and acid copper/alloy baths are preferred in decorative applications, such as in the manufacture of jewelry because such acid copper and acid copper alloy baths enable the formation of a smooth and bright surface. In the manufacture of decorative products, acid copper baths are the most preferred. One or more inorganic and organic acids are typically added to the copper or copper alloy baths to provide the desired acid environment.

Substrates may be conductive materials or if they are dielectric they may be made conductive using conventional methods known in the art and literature for making dielectric materials conductive. The substrates are components for electronic devices such as connectors, lead frames, packaging, optoelectronic components and printed wiring boards, and any substrate used for decorative purposes such as, but not limited to, jewelry. The substrate may be made of conductive materials such as iron, iron alloys, copper, copper alloys, nickel and nickel alloys. Dielectric materials include, but are not limited to polyaniline and polythiophene. Plastics such as acrylonitrile butadiene styrene, acrylonitrile butadiene styrene/polycarbonate, polyethylene, polyimide, polyurethane, acrylic and epoxy resins which include conductive fillers also may be plated with the electrolyte compositions. The substrates may be prepared for metallization using conventional cleaning methods and materials such as, but not limited to, soak cleaner, anodic and cathodic degreasing with subsequent activation of the degreased surface. Such methods and products are already known in art and literature.

The metals of the void inhibiting adhesion layer may be deposited adjacent the copper containing layer by conventional methods known in the art and in the literature. Such methods include, but are not limited to electroplating, electroless plating, immersion plating, PVD and CVD. Preferably, the metals are deposited by electroplating, electroless plating or immersion plating, more preferably by electroplating or electroless plating, most preferably by electroplating. In general, plating bath temperatures are from room temperature and higher, typically from room temperature to 100° C., more typically from room temperature to 60° C. When the metal or metal alloy is electroplated, current densities may range from 0.01 ASD to 5 ASD, typically from 0.1 ASD to 3 ASD.

This void inhibiting adhesion promoting layer is at least 0.02 μm thick or preferably from 0.05 μm to 10 μm, more preferably, from 0.05 μm to 5 μm. Such metals inhibit formation of voids, known as Kirkendall voids, which typically form at an interface between white bronze deposited from a cyanide-free electroplating bath and the copper containing layer. Even after heating the white bronze and copper containing layer to temperatures of 80° C. and higher the Kirkendall voids do not form or are substantially reduced at the interface between the white bronze and copper containing layer. The void inhibiting metals include, but are not limited to, zinc, bismuth, and nickel. Preferably, the void inhibiting metals are chosen from zinc and bismuth. More preferably, the void inhibiting metal is chosen from zinc. The void inhibiting metal adhesion promoting layer may be a single void inhibiting metal or binary or ternary alloy of the void inhibiting metals. Alternatively, the adhesion promoting layer may be a binary, ternary or quaternary alloy of a void inhibiting metal and one or more metals which are not void inhibiting. In general, such non-void inhibiting metals include, but are not limited to, copper, tin, gold, platinum, ruthenium, rhodium and iridium. Preferably such metals are chosen from copper, tin and gold. Most preferably such metals are chosen from copper and tin. Most preferably such metal is copper. Conventional sources of such non-void inhibiting metals may be used. In general, when one or more void inhibiting metals are part of a binary, ternary or quaternary alloy with a non-void inhibiting metal, the void inhibiting metals are included in the alloy in amounts of at least 4% by weight, preferably 10% to 90%, more preferably from 15% to 70%, most preferably from 20% to 50%. When zinc is the void inhibiting metal in combination with non-void inhibiting metals, the zinc content is at least 4%, preferably from 5% to 90%. When bismuth is in combination with non-void inhibiting metals, the bismuth content is at least 10%, preferably 10% to 30%. However, minor experimentation may be done to determine the amounts of void inhibiting metal and non-void inhibiting metals for a particular use.

Conventional sources of the void inhibiting metals may be used. The form of the metal may vary depending on the method used to deposit the metal. Typically when the metals are deposited by PVD and CVD, they are initially provided in their reduced metallic form. When the metals are deposited from electroplating, electroless and immersion baths, they are typically in the form of a water soluble salt. Conventional metal and metal alloy plating baths may be used. Zinc salts include, but are not limited to, zinc chloride, zinc sulfate, zinc oxide, zinc lactate and zinc nitrate. Bismuth salts include, but are not limited to, bismuth alkanesulfonates, bismuth nitrate, bismuth acetate, bismuth oxide and bismuth tartrate. Nickel salts include, but are not limited to nickel sulfate, nickel sulfamate, nickel phosphate and nickel chloride. The metal salts which provide the void inhibiting metals may be used in their conventional amounts. In general, such metal salts are included in amounts of at least 0.01 g/L or such as from 0.1 g/L to 100 g/L or such as from 1 g/L to 70 g/L. Preferably, the void inhibiting metal salts are included in amounts of 2 g/L to 60 g/L.

The void inhibiting metal plating baths may include one or more conventional additives, such as but not limited to, electrolytes, brighteners, levelers, hardeners, wetting agents, surfactants, ductility modifiers, suppressors, antioxidants, buffers, pH adjusting agents, reducing agents, chelating and complexing agents. Such additives are well known in the art and literature and may be included in the plating baths in conventional amounts.

When the void inhibiting layer is substantially composed of zinc, optionally a post treatment of the substrate with the zinc and copper underlayer is done. The plated part is dried with compressed air after zinc plating and heated for 0.5-2 hours from 100° C. to 200° C. to form a brass layer. The brass layer is the void inhibiting layer and typically is yellow and includes form 80% to 64% copper and 20% to 36% zinc. The brass layer is then degreased and activated prior to depositing the white bronze. Conventional methods may be used for air drying, degreasing, activating and heating the substrate.

A layer of white bronze is deposited on the void inhibiting metal layer. The white bronze is deposited by electroplating a tin/copper layer from an electroplating bath which is cyanide-free. While it is envisioned that any stable cyanide-free white bronze electroplating bath may be used to deposit the tin/copper alloy layer, preferably the white bronze formulations described below are used.

The white bronze electroplating baths include one or more sources of tin ions, one or more sources of copper ions and one or more mercaptans selected from the group consisting of mercaptotriazoles and mercaptotetrazoles. The aqueous electrolyte compositions are cyanide free and environmentally friendly as well as worker friendly. Waste disposal is less costly and hazardous and the danger of working with toxic chemicals is significantly reduced or workers using the baths.

Sources of tin include, but are not limited to, stannous organic sulfonate, such as stannous methanesulfonate, stannous sulfate, stannous gluconate, stannous citrate, stannous lactate and stannous halides, such as stannous bromide, stannous chloride, stannous chloride dihydrate. Many of such stannous salts are commercially available. Content of the stannous salt, based on the converted amount into the weight of tin (II), may be in the range such as from 1 g/L to 150 g/L or such as from 5 g/L to 30 g/L.

Sources of copper may be the same as disclosed above for the copper bath used in the acid copper bath. One or more sources of copper may be included in the tin/copper bath in amounts of 0.5 g/L to 150 g/l or such as from 10 g/l to 50 g/L.

Mercaptans include compounds selected from the group consisting of mercaptotriazoles and mercaptotetrazoles. Such mercaptans may be prepared from the literature or may be obtained commercially. While not being bound by theory, such mercaptans are believed to stabilize the tin and copper ions at their low oxidation states, thus improving the homogeneity of the tin/copper alloy. Such mercaptans are included in the compositions in amounts of 0.001 g/L to 100 g/L or such as from 0.01 g/L to 50 g/L or such as from 1 g/L to 10 g/L.

Mercaptotriazoles have the following general formula:

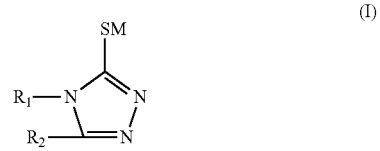

(I)

wherein M is hydrogen, $NH_4$, sodium or potassium and $R_1$ and $R_2$ are independently ($C_1$ to $C_{18}$)alkyl, substituted or unsubstituted or ($C_6$ to $C_{10}$)aryl, substituted or unsubstituted. Substituent groups include, but are not limited to, alkoxy, phenoxy, halogen, nitro, amino, sulfo, sulfamyl, substituted sulfamyl, sulfonylphenyl, sulfonyl-alkyl, fluorosulfonyl, sulfonamidophenyl, sulfonamido-alkyl, carboxy, carboxylate, ureido, carbamyl, carbamyl-phenyl, carbamylalkyl, carbonylalkyl and carbonylphenyl. Such mercaptotriazoles include, but are not limited to, 5-ethyl-3-mercapto-4-phenyl-1,2,4-triazole, 3-mercapto-5-pentyl-4-phenyl-1,2,4-triazole, 4,5-diphenyl-3-mercapto-1,2,4-triazole, 3-mercapto-4-phenyl-5-undecyl-1,2,4-triazole, 4,5-diethyl-3-mercapto-1,2,4-triazole, 4-ethyl-3-mercapto-5-pentyl-1,2,4-triazole, 4-ethyl-3-mercapto-5-phenyl-1,2,4-triazole, 5-p-aminophenyl-4-ethyl-3-mercapto-1,2,4-triazole, 5-p-acetoamidephenyl-4-ethyl-3-mercapto-1,2,4-triazole, 5-p-capronamidephenyl-4-ethyhl-3-mercapto-1,2,4-triazole and 4-ethyl-5-p-lauroamidephenyl-3-mercapto-1,2,4-triazole.

Mercaptotetrazoles have a general formula:

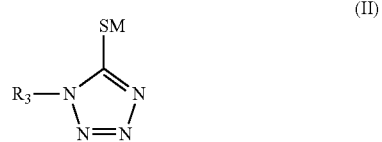

(II)

where M is hydrogen, $NH_4$, sodium or potassium and $R_3$ is ($C_1$ to $C_{20}$)alky, substituted or unsubstituted, or ($C_6$ to $C_{10}$)

aryl, substituted or unsubstituted. Substituents include, but are not limited to, alkoxy, phenoxy, halogen, nitro, amino, substituted amino, sulfo, sulfamyl, substituted sulfamyl, sulfonylphenyl, sulfonyl-alkyl, fluorosulfonyl, sulfoamidophenyl, sulfonamide-alkyl, carboxy, carboxylate, ureido carbamyl, carbamyl-phenyl, carbamylalkyl, carbonylalkyl and carbonylphenyl. Such mercaptotetrazoles include, but are not limited to, 1-(2-dimethylaminoethyl)-5-mercapto-1,2,3,4-tetrazole, 1-(2-diethylaminoethyl)-5-mercapto-1,2,3,4-tetrazole, 1-(3-methoxyphenyl)-5-mercaptotetrazole, 1-(3-ureidophenyl)-5-mercaptotetrazole, 1-((3-N-carboxymethyl)-ureidophenyl)-5-mercaptotetrazole, 1-((3-N-ethyl oxalamido)phenyl)-5-mercaptotetrazole, 1-(4-acetamidophenyl)-5-mercapto-tetrazole and 1-(4-carboxyphenyl)-5-mercaptotetrazole.

Typically, the mercaptotetrazoles are used in the tin/copper alloy compositions. More typically the mercaptotetrazoles where $R_3$ includes an amino substituent, substituted or unsubstituted, are included in the compositions.

The compositions also may include one or more optional additives. Such additives include, but are not limited to, surfactants or wetting agents, complexing or chelating agents, antioxidants, brighteners, grain refiners, buffers and conductivity agents.

Surfactants or wetting agents include, but are not limited to EO and/or PO derivatives of aliphatic alcohols containing one or more alkyl group or EO and/or PO derivatives of aromatic alcohols. The aliphatic alcohols may be saturated or unsaturated. Such aliphatic and aromatic alcohols may be further substituted, for example, with sulfate or sulfonate groups. Suitable wetting agents include, but are not limited to, ethoxylated polystyrenated phenol containing 12 moles of EO, ethoxylated butanol containing 5 moles of EO, ethoxylated butanol containing 16 moles of EO, ethoxylated butanol containing 8 moles of EO, ethoxylated octanol containing 12 moles of EO, ethoxylated octylphenol containing 12 moles of EO, ethoxylated/propoxylated butanol, ethylene oxide/propylene oxide block copolymers, ethoxylated beta-naphthol containing 8 or 13 moles of EO, ethoxylated beta-naphthol containing 10 moles of EO, ethoxylated bisphenol A containing 10 moles of EO, ethoxylated bisphenol A containing 13 moles of EO, sulfated ethoxylated bisphenol A containing 30 moles of EO, and ethoxylated bisphenol A containing 8 moles of EO. Typically, such non-ionic surfactants or wetting agents are added in an amount of 0.1 g/L to 50 g/L, and preferably 0.5 g/L to 10 g/L.

Complexing or chelating agents include, but are not limited to, carboxylic acids and salts thereof, such as dicarboxylic acids, which include, but are not limited to, oxalic acid, malonic acid, succinic acid, tartaric acid and malic acid, tricarboxylic acids which include, but are not limited to, citric acid, and tricarballylic acid, aromatic carboxylic acids, which include, but are not limited to, phenylacetic acid, benzoic acid, and anisic acid, and amino carboxylic acids, which include, but are not limited to, iminodiacetic acid, nitrilotriacetic acid (NTA), ethylenediamine tetraacetic acid (EDTA), ethylenediamine-disuccinic acid and diethylenetriamine pentaacetic acid, N-heterocyclic carboxylic acids such as picolinic acid, dipicolinic acid, pyrazine carboxylic acid and pyrazine dicarboxylic acid. Salts of the foregoing acids also may be used. Such salts include, but are not limited to, alkali metal salts, such as sodium, potassium and lithium salts. Such complexing or chelating agents are included in the compositions in amounts of 10 g/L to 100 g/L, or such as from 15 g/L to 50 g/L.

Antioxidants may be added to the compositions to assist in keeping the tin in a soluble, divalent state. Such antioxidants include, but are not limited to, carboxylic acids, such as gallic acid and acetic acid, cresol, hydroquinone, hydroquinone-sulfonic acid and hdroxylated aromatic compounds, such as resorcinol, catechol and pyrocatechole. Such antioxidants are included in the compositions in amounts of 0.1 g/l to 5 g/L.

Other compounds which may help to minimize oxidation of stannous tin include, but are not limited to, aromatic diols such as unsubstituted and substituted benzenediols, naphthalenediols, anthracenediols or mixtures thereof. Substituents, which may be present on the substituted benzendiols and naphthalenediols, include, but are not limited to, alkyl of up to 12 carbon atoms, halogen such as chloro, cycloalkyl such as cyclohexyl and aryl such as phenyl. Aromatic diols include, but are not limited to, 1,2-benzenediol, methyl-1,4-benzendiol, cyclohexyl-1,4-benzendiol, phenyl-1,4-benzenediol, 1,2-naphthalenediol and 1,4-naphthalenediol. Aromatic diols may be included in the compositions in amounts of 0.05 g/L to 10 g/L.

Optional brighteners which may be added to the tin/copper alloy compositions include, but is not limited to, aromatic aldehydes, such as chlorobenzaldehyde, derivatives of aromatic aldehydes such as benzalacetone and aliphatic aldehydes, such as acetaldehyde and glutaraldehyde. Other suitable brighteners include, but are not limited to, bismuth nitrate, cobalt nitrate, antimonyl chloride and selenic acid. Such brighteners are included in the compositions in amounts of 0.5 g/L to 3 g/L.

Conductivity agents may be included in the electrolyte compositions to maintain a suitable current in the compositions during electroplating. Such conductivity agents include, but are not limited to, alkali metal sulfates, such as sodium sulfate, alkali metal alkanesulfonates, such as sodium methane sulfonate, alkali metal chlorides, such as sodium chloride or potassium chloride, ammonium sulfate, methane sulfonic acid, sulfuric acid, citric acid, sodium acetate, sodium carbonate, diluent soluble salts of citrates, such as ammonium citrate, lactates, gluconates, such as sodium gluconate, potassium pyrophosphate, or mixtures thereof. Such conductivity agents also help maintain the pH of the compositions. Conductivity agents may be employed in amounts such as from 5 gm/L to 300 gm/L or such as from 20 gm/L to 150 gm/L.

Grain refiners may be added to further improve deposit appearance and operating current density range. Such grain refiners include, but are not limited to, alkoxylates, such as the polyethoxylated amines JEFFAMINE T-403 or TRITON RW, sulfated alkyl ethoxylates, such as TRITON QS-15, and gelatin or gelatin derivatives. The amounts of such grain refiners range from 0.01 to 20 mL/L, or such as from 0.5 to 8 mL/L, or such as from 1 to 5 mL/L.

The white bronze binary alloy includes from 10% to 60% tin and 40% to 90% copper or such as from 10% to 40% tin and 60% to 90% copper. Typically, white bronze deposits electroplated from the acidic electrolytes have equilibrium and non-equilibrium structures such as $Cu_6Sn_5$ or $Cu_3Sn$. The white bronze binary alloy has a uniform white, bright color, which helps post-electroplate metal top layers, such as chromium. Also, the binary alloy is stable.

Substrates are contacted for a sufficient time with electroplating bath to electroplate a white bronze film ranging from 0.01 μm to 20 μm or such as from 0.1 μm to 10 μm or such as from 1 μm to 5 μm adjacent the void inhibiting layer. The electroplating bath may be applied by vertical application where the substrate is immersed in the bath, or the electroplating bath may be sprayed onto the void inhibiting layer of the substrate such as in horizontal electroplating. Other examples of electroplating include, but are not limited to, rack plating, barrel plating, and high speed plating such as hoop plating or jet plating.

Current density may range from 0.01 ASD to 20 ASD. The range may vary depending on the method used. For example in rack plating the current density may range from 0.5 ASD to 5 ASD or such as from 1 ASD to 3 ASD. In barrel plating the current density may range from 0.01 ASD to 1 ASD or such as from 0.1 ASD to 0.5 ASD. The anode may be soluble, such as tin, copper or tin/copper alloys, or an insoluble anode, such as iridium trioxide or platinum dioxide. Other types of insoluble and soluble anodes are suitable. Plating temperatures may range from 15° C. to 100° C. or such as from 20° C. to 50° C. The pH of the bath ranges from less than 1 to 10, preferably from 0 to 8, more preferably from 0 to 5.

FIG. 1 illustrates the basic arrangement of the different metal layers. FIG. 1 is an article containing a white bronze layer adjacent a void inhibiting layer which is adjacent a copper or copper alloy layer. The copper or copper alloy layer is adjacent a substrate.

The methods provide good adhesion of tin/copper alloys to the copper containing layer and at the same time reduce voids often found at the interface between the tin/copper layer and the copper containing layer even upon exposure of the plated substrate to high temperatures of 80° C. and greater.

The following examples are intended to further illustrate the invention but are not intended to limit its scope.

Example 1

A cleaned brass panel substrate (70% Cu/30% Zn) 5 cm×5 cm was plated with copper from COPPER GLEAM™ DL 900 high leveling acid copper electroplating solution (available from Rohm and Haas Electronic Materials, LLC, Marlborough, Mass.) under standard conditions. The copper layer was 8-10 µm thick. After rinsing with water the copper layer was then electroplated with zinc from an aqueous zinc bath having a formulation as shown in Table 1.

TABLE 1

| COMPONENT | AMOUNT |
| --- | --- |
| Zinc as zinc chloride | 2 g/L |
| Boric acid | 23 g/L |
| Potassium chloride | 220 g/L |
| pH | 4 |

Zinc electroplating was done at room temperature for 30 seconds at 0.5ASD. The counter electrode was a platinum dioxide insoluble anode. A zinc adhesion layer of 0.05 µm was deposited on the copper underlayer. The zinc plated part was then dried with compressed air and heated in a conventional convection oven for 1.5 hours at 150° C. to form a yellow brass layer. The panel was then degreased and activated with RONANCLEAN™ DLF cleaning formulation and RONASALT™ 369 activating formulation (available from Rohm and Haas Electronic Materials, LLC, Marlborough, Mass.) under standard conditions and subsequently electroplated with the aqueous white bronze formulation shown in Table 2.

TABLE 2

| COMPONENT | AMOUNT |
| --- | --- |
| Stannous sulfate | 7 g/l |
| Copper sulfate pentahydrate | 0.5 g/L |

TABLE 2-continued

| COMPONENT | AMOUNT |
| --- | --- |
| Sulfuric acid (concentrated) | 200 mL/L |
| Ethylenediamine disuccinic acid | 10 g/L |
| 1-(2-dimethylaminoethyl)-5-mercapto-1,2,3,4-tetrazole | 1 g/L |
| Picolinic acid | 0.5 g/L |
| Pyrocatechole | 50 g/l |
| EO/PO block copolymer | 50 g/L |
| Benzalacetone | 0.5 g/L |

The pH of the white bronze electroplating bath was maintained below 1 and the temperature of the bath was at room temperature. The anode was a platinum dioxide insoluble anode. Electroplating was done for 5 minutes at 3 ASD to deposit a white bronze layer 5 µm thick the yellow brass layer.

The sample was then examined for adhesion. The sample was cut in half with scissors. No flakes of white bronze were observed. The sample did not show any detachment of the white bronze layer from the copper underlayer as observed with a Wild M3 optical microscope.

Figure 2:
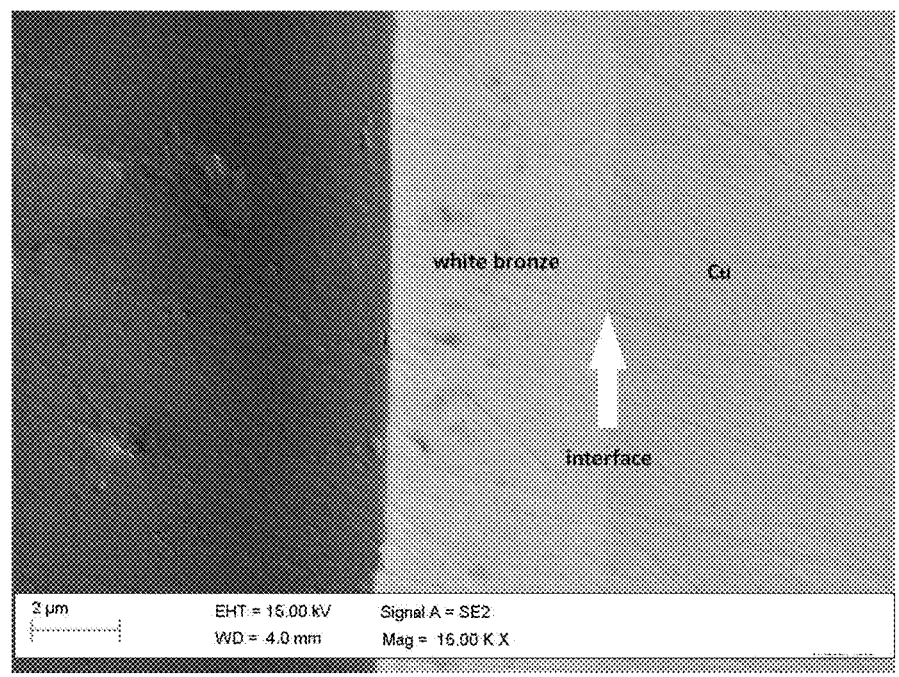
FIG. 2 is a 15,000×FE-SEM cross section of white bronze plated over a copper deposit with intervening zinc layer after heat treatment for 1 hour at 300° C.

The sample was then heated to 300° C. in a conventional convection oven for 1 hour. The adhesion test was repeated with the same results as prior to heating at 300° C. There was no indication of adhesion failure. A 15,000×FE-SEM cross section was taken of the sample with a sigma SEM equipped with an EDX from Zeiss as shown in FIG. 2. The acid copper deposit is at the right side of FIG. 2 followed by a thin layer of yellow brass as shown by the white arrow separating the copper layer from the white bronze. The dark colored layer at the left side of the picture is embedding material. Small Kirkendall voids are shown in the white bronze deposit; however, voids did not form at the interface of the white bronze and copper layer.

Example 2

The method described in Example 1 was repeated with the same type of brass panel substrate except that the void inhibiting layer was copper/zinc alloy (4% Zn) electroplated from the aqueous copper/zinc formulation disclosed in Table 3 below.

TABLE 3

| COMPONENT | AMOUNT |
| --- | --- |
| Copper as copper(II)hydroxide | 4 g/L |
| Zinc as zinc oxide | 16 g/L |
| Potassium carbonate | 1 g/l |
| Hydroethylen-1,1-diphosphonic acid | 250 g/L |
| KOH | 100 g/L |
| Nonylphenol ethoxylate | 100 mg/l |
| Sodium lauryl sarcosinate | 100 mg/l |

The pH was adjusted and maintained to 8.5. Electroplating was done at 0.5 ASD for 5 minutes. The bath temperature was maintained at 32° C. The counter electrode was a platinum dioxide insoluble anode. The copper/zinc alloy deposit on the copper underlayer was 0.3 µm thick. The panel was subsequently plated with the white bronze formulation in Table 2. Plating conditions and parameters for the white bronze were the same as in Example 1.

Figure 3:
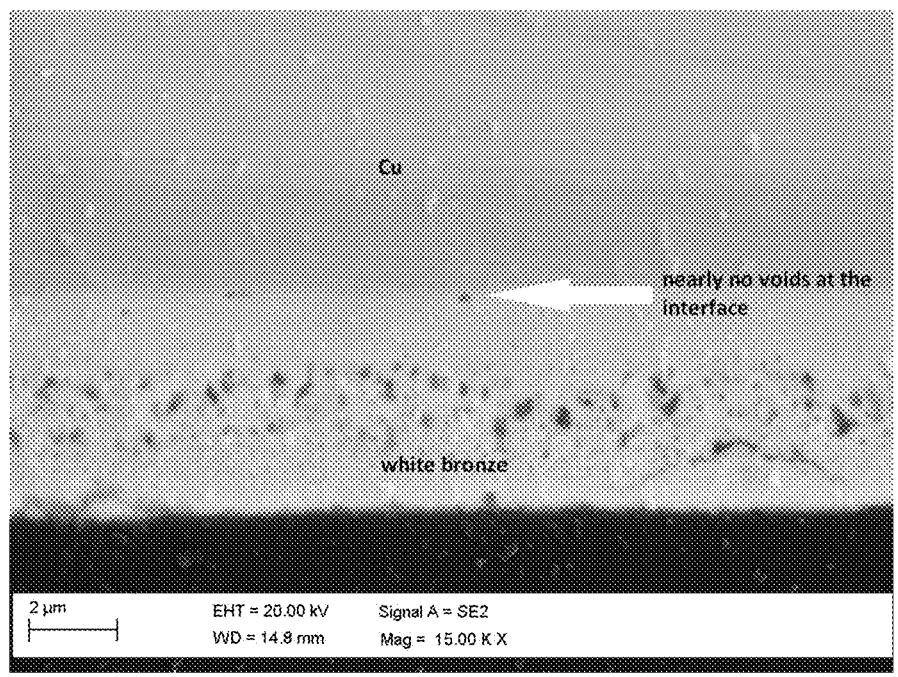
FIG. 3 is a 15,000×FE-SEM cross section of white bronze plated over a copper deposit with an intervening copper/zinc layer after heat treatment for 1 hour at 300° C.

Adhesion analysis was done by the same method as described in Example 1. The sample did not show any detachment of the white bronze layer from the copper underlayer. A 20,000×FE-SEM cross section analysis of the sample heated to 300° C. for 1 hour is shown in FIG. 3. The acid copper layer is located at the top of the picture and the dark layer at the bottom is embedding material. The white bronze deposit is located between those two layers. The thin copper/zinc layer is indicated by the white arrow. Some Kirkendall voids are formed but they are mostly located within the white bronze layer and not at the interface between white bronze and the underlayer. The sample did not show any adhesion failure.

Example 3

The method described in Example 1 was repeated except that no void inhibiting metal layer was deposited prior to electroplating white bronze on the copper underlayer. The copper electroplating solution and the white bronze formulation were the same as in Example 1 as well as the plating parameters.

Figure 4:
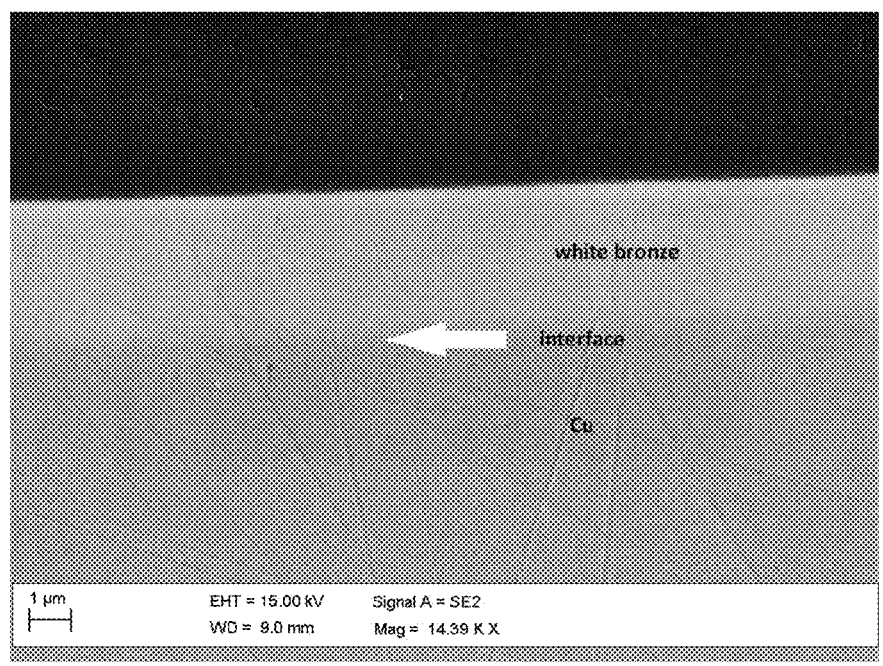
FIG. 4 is 14,390×FE-SEM cross section of white bronze over a copper deposit as plated.

No heat treatment was applied to the sample. Adhesion was good; however, some detachment of white bronze from the copper layer was observed during cutting. FIG. 4 is a 14,390× FE-SEM cross section of the sample. The white arrow indicates the interface formed at the white bronze and copper layer. No voids were observed in the white bronze deposit or at the interface.

Figure 5:
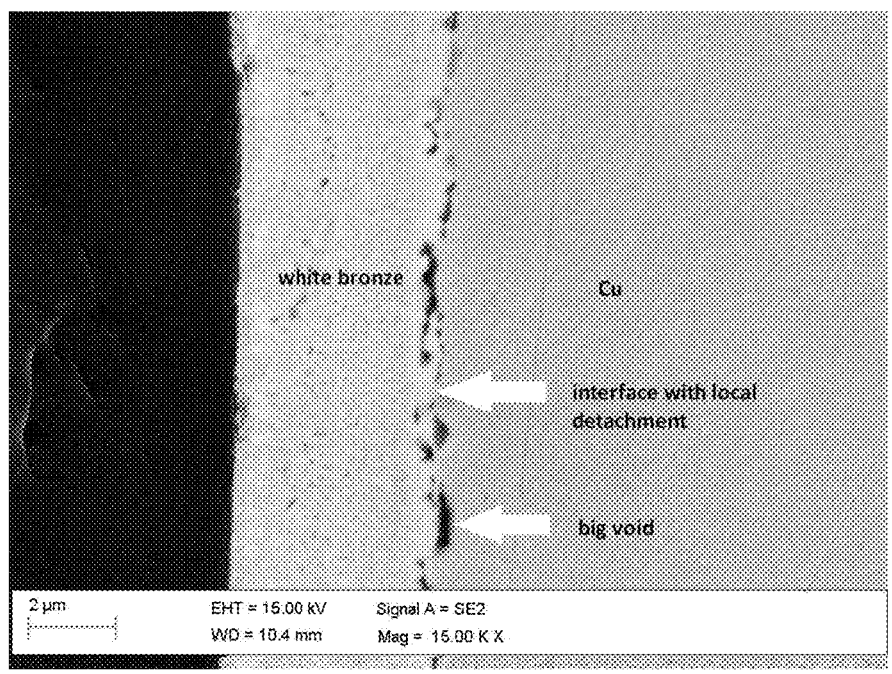
FIG. 5 is a 15,000×FE-SEM cross section of white bronze over a copper deposit after heat treatment for 0.5 hours at 300° C.

The method was repeated except that the sample was exposed to heat for 0.5 hours at 300° C. Significant flaking of the white bronze layer occurred during cutting. Blistering also was apparent with large sections of the white bronze detached from the copper. Also large portions of the white bronze deposit were detached from the copper at the cutting edge. FIG. 5 is a 15,000×FE-SEM of the sample and shows that voids formed at the interface between the white bronze and the copper layer. One white arrow indicates the interface and the second white arrow points to a large void.

Example 4

The method described in Example 1 was repeated with the same type of brass panel substrate except that the void inhibiting layer was a nickel deposit electroplated from the aqueous nickel formulation disclosed in Table 4 below.

TABLE 4

| COMPONENT | AMOUNT |
| --- | --- |
| Nickel ions as nickel sulfate hexahydrate | 60 g/l |
| Chloride ions as nickel chloride hexahydrate | 10 g/l |
| Boric acid | 45 g/l |
| Saccharine sodium salt | 0.5 g/l |
| Fatty alcohol sulfated ethoxylate | 2 ml/l |

The pH of the solution was adjusted and maintained to 4.2. Electroplating was done at 1 ASD for 30 sec. The bath temperature was maintained at 55° C. The counter electrode was a soluble nickel anode. The nickel deposit on the copper underlayer was 0.08 μm thick. The sample was subsequently plated with the white bronze formulation in Table 2. Plating conditions and parameters for the white bronze were the same as in Example 1.

Figure 6:
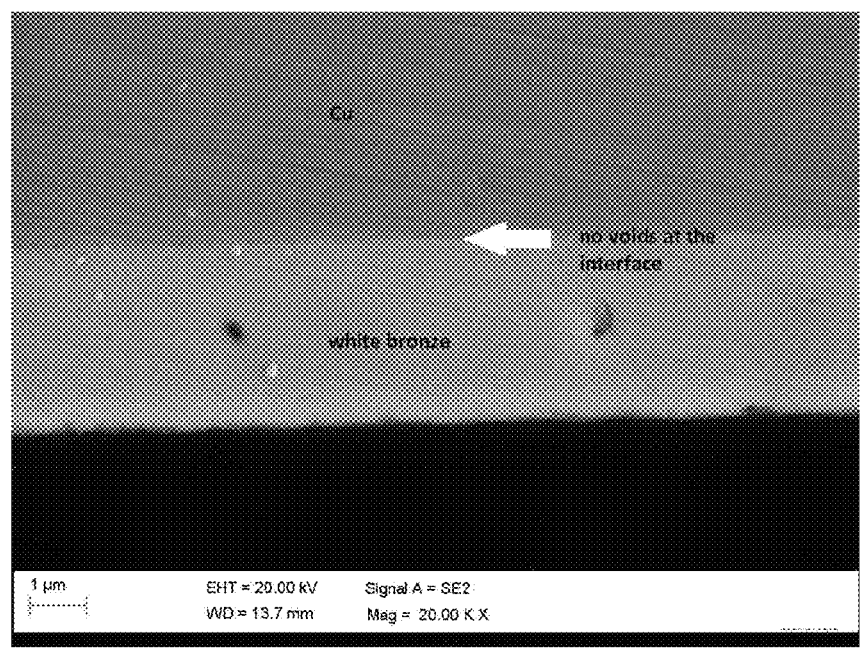
FIG. 6 is a 20.000×FE-SEM cross section of white bronze over a copper deposit with an intervening nickel layer after heat treatment for 1 hour at 300° C.

The sample was then tested for adhesion. No flaking was observed during cutting and there was no detachment of the white bronze layer from the copper underlayer prior to heating or after the heat treatment. A 20,000×FE-SEM cross section analysis of the sample after it was heated to 300° C. for 1 hour is shown in FIG. 6. The white arrow indicates a nickel interface between the white bronze and the copper layer. No Kirkendall voids were formed at the interface and also the void formation within the white bronze deposit was avoided, indicating that nickel was a sufficient diffusion barrier for copper and tin ions.

Example 5

The method described in Example 1 was repeated with the same type of brass panel substrate except that the void inhibiting layer was a copper/bismuth (10% Bi) deposit electroplated from the aqueous formulation disclosed in Table 5 below.

TABLE 5

| COMPONENT | AMOUNT |
| --- | --- |
| Copper as copper sulfate pentahydrate | 20 g/l |
| Bismuth as bismuth methansulfonate | 1 g/l |
| Sulfuric acid | 300 ml/l |
| Soldium chloride | 320 mg/l |
| EO/PO Block polymer | 20 g/l |
| Naphthol ethoxylate | 200 mg/l |
| Polymer epichlorhydrin/imidazole | 5 ml/l |

Electroplating was done at 1 ASD for 1 minute. The counter electrode was a soluble copper anode. The copper/bismuth alloy deposit on the copper underlayer was 0.5 μm thick. The panel was subsequently plated with the white bronze formulation in Table 2. Plating conditions and parameters for the white bronze were the same as in Example 1.

Figure 7:
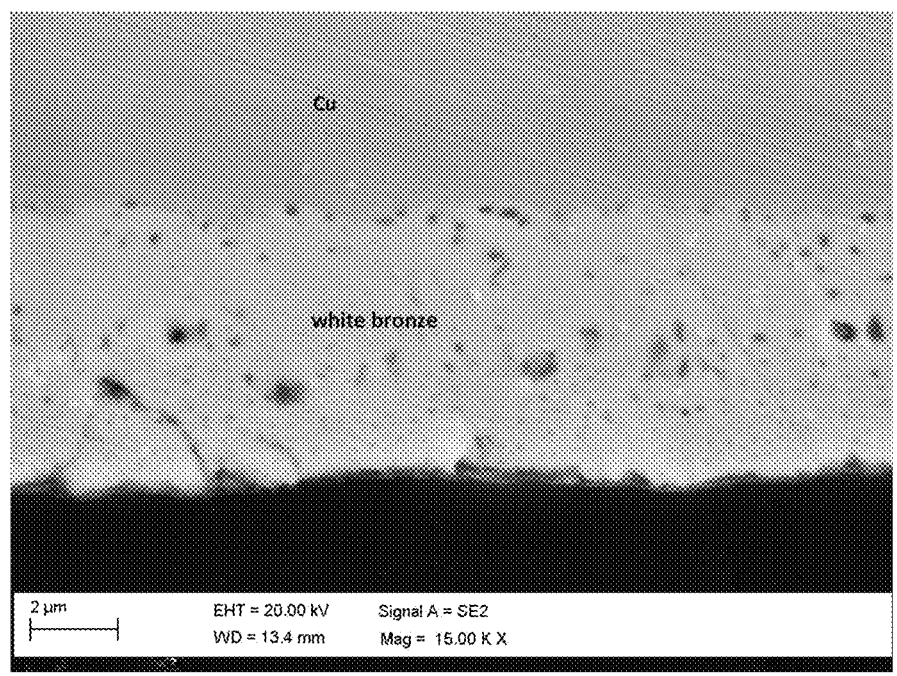
FIG. 7 is a 15.000×FE-SEM cross section of white bronze over a copper deposit with an intervening copper/bismuth layer after heat treatment for 1 hour at 300° C.

The sample was then tested for adhesion. There was no flaking during cutting and there was no indication of any detachment of the white bronze layer from the copper underlayer prior to heating and after heating. A 15000×FE-SEM cross section analysis of the sample after being heated to 300° C. for 1 hour is shown in FIG. 7. While void formation was not completely avoided with the copper/bismuth interface layer, the void formation was reduced at the interface in contrast to acid copper with subsequent heat treatment as in Example 3 and shown in FIG. 5.

What is claimed is:

1. A method comprising:
   a) depositing onto a substrate comprising a copper containing layer a metal layer composed of zinc or a binary zinc/copper alloy adjacent the copper containing layer;
   b) drying the substrate with compressed air before heating for 0.5 to 2 hours at a temperature from 100° C. to 200° C. to form a brass layer; and
   c) electroplating a tin/copper alloy layer from a cyanide-free tin/copper electroplating bath adjacent the brass layer.

2. The method of claim 1, wherein the metal layer of zinc or binary zinc/copper alloy is at least 0.02 μm thick.

3. The method of claim 2, wherein the metal layer of zinc or binary zinc/copper has a thickness of 0.05 μm to 10 μm.

4. The method of claim 1, wherein the tin/copper layer is at least 0.01 μm to 20 μm thick.

5. The method of claim 1, wherein the binary zinc/copper alloy comprises 10% to 90% zinc.

6. The method of claim 1, wherein the brass layer comprises 80% to 64% copper and 20% to 36% zinc.

* * * * *